J. W. BURLEIGH.
DYNAMO ELECTRIC MACHINE.
APPLICATION FILED JULY 9, 1909.
1,186,542.
Patented June 13, 1916.
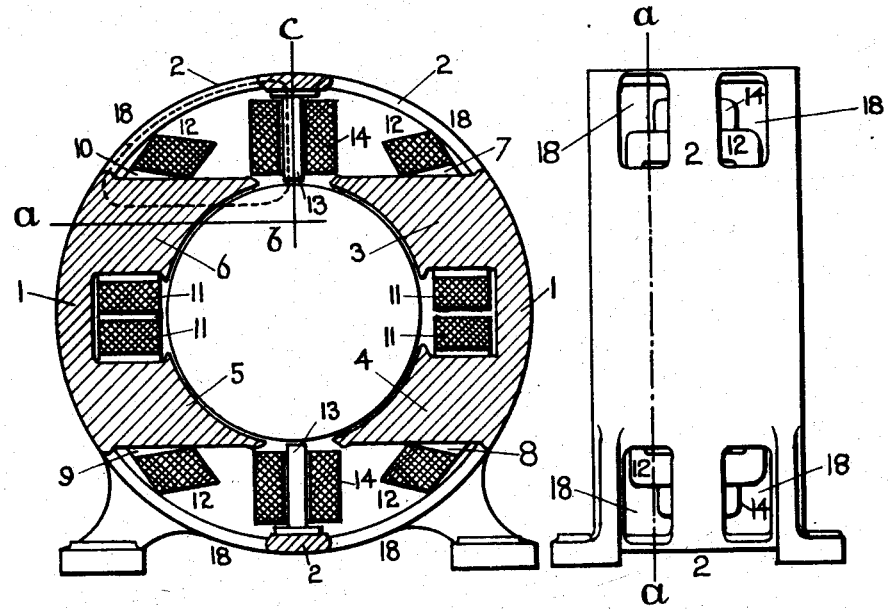
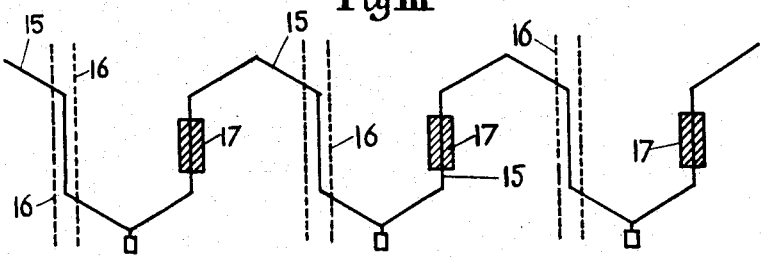

UNITED STATES PATENT OFFICE.

JOHN WESLEY BURLEIGH, OF ROWBARTON, TAUNTON, ENGLAND.

DYNAMO-ELECTRIC MACHINE.

1,186,542. Specification of Letters Patent. Patented June 13, 1916.

Application filed July 9, 1909. Serial No. 506,807.

*To all whom it may concern:*

Be it known that I, JOHN WESLEY BURLEIGH, of Hazeldene, Leslie street, Rowbarton, Taunton, Somersetshire, England, have invented new and useful Improvements in Dynamo-Electric Machines, of which the following is a specification.

My invention relates to improvements in dynamo-electric machines, and it consists in the application of commutating poles to a known main magnet structure, namely a magnet structure of the parallel limbed horse-shoe type.

By means of my invention a greater output can be obtained from a given quantity of material than has hitherto been found possible with commutating pole machines.

In order that my invention may be readily understood I shall now proceed to describe it with reference to the accompanying drawings which illustrate a four-pole machine constructed in accordance with my invention.

In these drawings, Figure I is a cross section taken on the line $a$—$a$ of Fig. II (the armature being indicated by a circle merely), showing the field coils in position, Fig. II a side view of the carcass showing the ventilating holes and parts of the field coils, and Fig. III a diagram of an armature winding in conjunction with the field coils and commutating poles.

Referring now to these figures, 1, 1 are parallel limbed horse-shoe field magnets united by the yokes 2 each of which carries one commutating pole 13. On the limbs 3, 4, 5 and 6 of the horse-shoe field magnets (3 and 5 being let us say S poles and 4 and 6 N poles) are mounted the main field coils 7, 8, 9 and 10. As will be seen the main field coils are arranged so that a part 11 of each lies in the neutral zone directly over and parallel, or nearly parallel, with the coils of the armature which at the time are undergoing commutation. The opposite parts 12 of the main field coils are placed as shown so as to leave a considerable space between them. In this space commutating or reversing poles 13 are placed with their coils 14 the said poles being carried by the yokes 2 connecting the main horse-shoe magnets. The arrangement of poles and windings is shown diagrammatically in Fig. III in which the full line 15 represents a winding of a series wound armature, the dotted line 16 the portions 11 of the field coils and the rectangles 17 the commutating poles. By locating the field coils in this position I find that they so assist in the commutation that the flux required from each commutating pole is only about half of that required in the known type of commutating pole machine having one commutating pole per pair of main poles. In other words the effect derived from placing portions of the main coils in the position mentioned is such that the excitation required on each commutating pole is little, if any, in excess of an ordinary machine having one commutating pole per main pole. And, further, by placing portions of the field coils in the positions mentioned magnetic leakage is reduced.

A great advantage obtained by my arrangement of the axes as just defined is that the path for the main flux due to the main field coils which passes through the horse-shoe main magnet frame is of very low induction due to the fact that the path $x$ is only about one-third of the path $y$.

Owing to the small magnetic flux in the yokes 2 these may be of small cross-sectional area and thus large ventilating holes may be cut at 18 through which air may pass for cooling purposes. Thus in a machine constructed under my invention a much larger percentage of heat may be removed than in the case of a machine of the usual protected type of present day construction.

Any of the usual windings may be employed both for the field and the armature coils.

In the term dynamo-electric machine it will be understood that I include generators, motors, dynamotors, and the like.

It is to be understood that I do not limit myself to the number of poles shown in the drawings as any convenient number of poles may be employed.

Having thus described my invention what I claim as new and desire to secure by Letters Patent is:—

1. A dynamo electric machine having a field magnet frame, comprising a series of pairs of horse-shoe main field magnets joined by a frame yoke portion of reduced cross-section, and carrying interpole cores, exciting windings for the main field cores and exciting windings for the interpole cores.

2. A dynamo-electric machine having main-poles with their cores parallel, a yoke of magnetic material of less cross-section than the path for the main flux and a commutating-pole carried thereby, an armature, field-coils arranged with those portions which lie in the neutral zone close to, immediately over and parallel or nearly parallel with the coils of said armature undergoing commutation, and with those portions remote from the neutral zone spaced from the commutating pole.

3. A dynamo-electric machine having two oppositely disposed parallel-limbed horseshoe main magnet structures, yokes of magnetic material connecting said main magnets, commutating-poles carried one by each of said yokes and disposed substantially normal to the limbs of said magnet, an armature, and field-coils arranged with those portions which lie in the neutral zone close to, immediately over and parallel or nearly parallel with the coils of said armature undergoing commutation, and with those portions remote from the neutral zones spaced from the commutating poles, thereby providing a comparatively large space between them for the said interposed commutating-poles, respectively, substantially as described.

In witness whereof I have signed my name to this specification in the presence of two subscribing witnesses.

JOHN WESLEY BURLEIGH.

Witnesses:
 HERBERT GEORGE DERWENT MOGER,
 CHARLES HENRY DENMAN.

Copies of this patent may be obtained for five cents each, by addressing the "Commissioner of Patents, Washington, D. C."